United States Patent
Praud

(10) Patent No.: US 8,308,407 B2
(45) Date of Patent: Nov. 13, 2012

(54) RACK FOR PRESSURIZED GAS BOTTLES

(76) Inventor: Randy A. Praud, Rocky Mountain House (CA)

(*) Notice: Subject to any disclaimer, the term of this patent is extended or adjusted under 35 U.S.C. 154(b) by 469 days.

(21) Appl. No.: 12/707,413

(22) Filed: Feb. 17, 2010

(65) Prior Publication Data

US 2010/0270346 A1    Oct. 28, 2010

Related U.S. Application Data

(62) Division of application No. 11/495,893, filed on Jul. 31, 2006, now abandoned.

(51) Int. Cl.
*B60P 7/08* (2006.01)
(52) U.S. Cl. .............. 410/36; 410/34; 410/42; 410/120
(58) Field of Classification Search ........... 410/32, 410/34, 35, 36, 42, 120; 224/404, 405; 296/3; 211/70.4, 82, 85.18; 206/391, 443, 446
See application file for complete search history.

(56) References Cited

U.S. PATENT DOCUMENTS

| 3,643,813 | A | | 2/1972 | Noonan | |
|---|---|---|---|---|---|
| 4,564,109 | A | | 1/1986 | Stavio | |
| 5,040,933 | A | * | 8/1991 | Lee et al. | 410/42 |
| 5,154,556 | A | | 10/1992 | Wappel | 410/36 |

* cited by examiner

*Primary Examiner* — Stephen Gordon
(74) *Attorney, Agent, or Firm* — Adrian D. Battison; Ade & Company Inc.

(57) ABSTRACT

A rack assembly for transportation of pressurized gas bottles in a vehicle has a first rack on one side and a second rack on the other side each supporting five upright bottles in a row, together with a rigid transverse brace structure connecting between an upper part of the first rack and an upper part of the second rack to hold the first and second rack members in braced position at said first and second sides. Each of the racks is formed by an inner and an outer plate member each having five part circular cut outs in the adjacent surfaces surrounded by a resilient strip for clamping the bottles side by side by an over-center latch which tightens the members together.

14 Claims, 5 Drawing Sheets

RACK FOR PRESSURIZED GAS BOTTLES

This application is a divisional application from application Ser. No. 11/495,893 filed Jul. 31, 2006 and now abandoned.

This invention relates to a rack for mounting pressurized gas bottles for transportation of the bottles.

BACKGROUND OF THE INVENTION

Pressurized gas bottles are commonly used in many industrial processes and supply many different gases for many different uses. Many of these gases are hazardous and hence release of the gas can be dangerous and in some cases explosions can occur. Transportation of such bottles which often weight of the order of 150 lbs. is common so that they can be moved to a site of use from a site of production or storage. In the event of any kind of accident during the transportation, the bottles can be released from their transport position with the potential for catastrophic results.

Typically such bottles are transported in upright position often along the sides of a transport trailer where the bottom of the bottle is inserted in a wooden rack and the top of the bottle is simply chained to the side wall. In the event of any impact with the vehicle, the bottles can readily break free. In the event of a roll over of the vehicle the bottles can be released from their position of storage and free to move to any location inside or outside the vehicle. Up until now little attention appears to have been applied to proper restraint of the bottles during transportation.

A number of previous proposals provide brackets which attach to a support wall such as the side wall of a vehicle and which engage an upper part of the bottles. However these brackets assume structural integrity of the support wall which may not be sufficient strong to accommodate the forces involved in an accident, bearing in mind that a row of such bottles can weight as much as 1000 lbs.

One example of an arrangement of this type is shown in U.S. Pat. No. 3,643,813 (Noonan) issued Feb. 22, 1972 where a number of such bottles are attached to a rail in two or more rows. However the structural integrity of the rail itself is not addressed.

A number of other alternatives provide a frame or container in the form of a palette which can be independently moved from place to place carrying a series of the bottles. One example is shown in U.S. Pat. No. 4,564,109 (Stavio) issued Jan. 14, 1986 which discloses a container placed upon a palette for containing two rows of such bottles with an upstanding and overlying rail by which the palettes can be lifted.

However none of these arrangements are suitable to provide an effective mounting of the bottles during transportation in a manner which can maintain the bottles properly retained in place even in the event of a serious accident.

SUMMARY OF THE INVENTION

It is one object of the invention to provide an improved rack which more effectively supports gas bottles during transportation in a transportation vehicle to reduce the potential for dangerous materials to be released after an accident including the vehicle.

According to one aspect of the invention there is provided a rack for transportation of pressurized gas bottles in a transportation vehicle comprising:

a first rack member for engaging and supporting a first plurality of the bottles in upstanding orientation;

the first rack member having an upper bottle engagement member for rigidly engaging an upper part of each of the bottles;

the first rack member having a lower bottle engagement member for rigidly engaging a lower part of each of the bottles;

the first rack member having frame members interconnecting the upper and lower bottle engagement members such that the first rack member forms a rigid structure for upstanding along a first side of the transportation vehicle and for holding the bottles in rigid upright position along said first side;

a second rack member for engaging and supporting a second plurality of the bottles in upstanding orientation;

the second rack member having an upper bottle engagement member for rigidly engaging an upper part of each of the bottles;

the second rack member having a lower bottle engagement member for rigidly engaging a lower part of each of the bottles;

the second rack member having frame members interconnecting the upper and lower bottle engagement members such that the second rack member forms a rigid structure for upstanding along a second side of the transportation vehicle and for holding the bottles in rigid upright position along said second side;

and a rigid transverse brace structure for connecting between an upper part of the first rack member and an upper part of the second rack member to hold the first and second rack members in fixed braced position at said first and second sides.

Preferably each of the first and second rack members is arranged to support the plurality of bottles in a single row.

Preferably each of the bottle engagement members forms a clamp for clamping around the plurality of bottles.

Preferably the clamp has two rigid members each having a plurality of recesses each for partly surrounding a respective one of the bottles and a tensioning element for drawing the two rigid members together Preferably the tensioning element is an over-center latch.

Preferably the over-center latch is adjustable to adjust tension between the rigid members Preferably each of the two rigid members of the clamp are cut from plate.

Preferably each of the two rigid members of the clamp are formed by a top plate and turned down sides welded to form a box structure Preferably each of the recesses is defined by an edge of a plate and has a resilient strip around the edge for resiliently engaging an outer surface of the respective bottle.

Preferably the lower bottle engagement member has an outer rigid member fixed to the frame members and an inner rigid member movable relative to the frame members with the outer rigid member having a flat base for receiving a bottom apex of the bottles when engaged in the upper and lower bottle engagement members.

Preferably the lower bottle engagement member has a flat base for receiving a bottom apex of the bottles when engaged in the upper and lower bottle engagement members and wherein the flat base is covered by a resilient material.

Preferably the upper bottle engagement member has an outer rigid member fixed to the frame members and an inner rigid member movable relative to the frame members and wherein the outer rigid member has a support element thereon for engaging and supporting the inner rigid member as it moves in a sliding action relative to the frame members.

Preferably the frame members comprise a row of at least two vertical posts at spaced positions along the side.

Preferably the vertical posts pass through holes in the upper and lower engagement members.

Preferably the brace structure comprises a plurality of rails each extending across from one of the posts of the first rack member to a corresponding post of the second rack member.

According to a second aspect of the invention there is provided a transportation vehicle for transportation of pressurized gas bottles in a comprising:

a vehicle box having a floor, a roof and a first and a second side wall;

a first rack member for engaging and supporting a first plurality of the bottles in upstanding orientation;

the first rack member having an upper bottle engagement member for rigidly engaging an upper part of each of the bottles;

the first rack member having a lower bottle engagement member for rigidly engaging a lower part of each of the bottles;

the first rack member having frame members interconnecting the upper and lower bottle engagement members such that the first rack member forms a rigid structure for holding the bottles in rigid upright position;

the first rack member being arranged in upstanding position along the first side of the transportation vehicle;

the first rack member being fastened to the floor of the transportation vehicle;

a second rack member for engaging and supporting a second plurality of the bottles in upstanding orientation;

the second rack member having an upper bottle engagement member for rigidly engaging an upper part of each of the bottles;

the second rack member having a lower bottle engagement member for rigidly engaging a lower part of each of the bottles;

the second rack member having frame members interconnecting the upper and lower bottle engagement members such that the second rack member forms a rigid structure for holding the bottles in rigid upright position;

the second rack member being arranged in upstanding position along the second side of the transportation vehicle;

the second rack member being fastened to the floor of the transportation vehicle;

and a rigid transverse brace structure extending across the roof and connecting an upper part of the first rack member and an upper part of the second rack member to hold the first and second rack members in fixed braced position at said first and second sides.

According to a third aspect of the invention there is provided a rack for transportation of pressurized gas bottles in a transportation vehicle comprising:

a rack member for engaging and supporting a first plurality of the bottles in a row in upstanding orientation;

the rack member having an upper bottle engagement member for rigidly engaging an upper part of each of the bottles;

the rack member having a lower bottle engagement member for rigidly engaging a lower part of each of the bottles;

the rack member having frame members interconnecting the upper and lower bottle engagement members such that the rack member forms a rigid structure for holding the bottles in rigid upright orientation;

wherein each of the bottle engagement members forms a clamp for clamping around the plurality of bottles with the clamp having a first rigid member having a plurality of recesses each for partly surrounding a respective one of the bottles and a second rigid member having a plurality of recesses each for partly surrounding a respective one of the bottles facing the first rigid member, and a tensioning element for drawing the two rigid members together.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
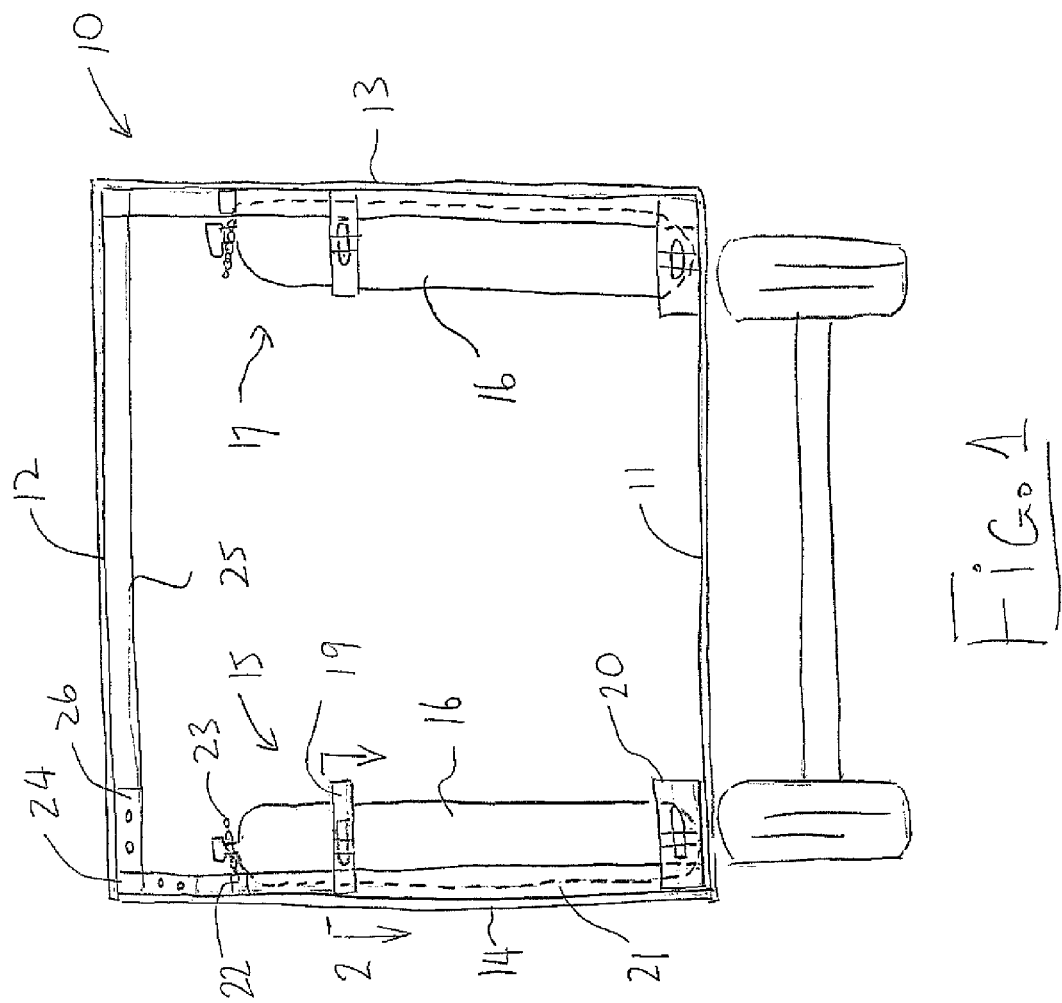
FIG. 1 is a rear elevational view of a rack according to the present invention mounted in a vehicle with the rear of the vehicle open to expose the structure of the rack.
Figure 5:
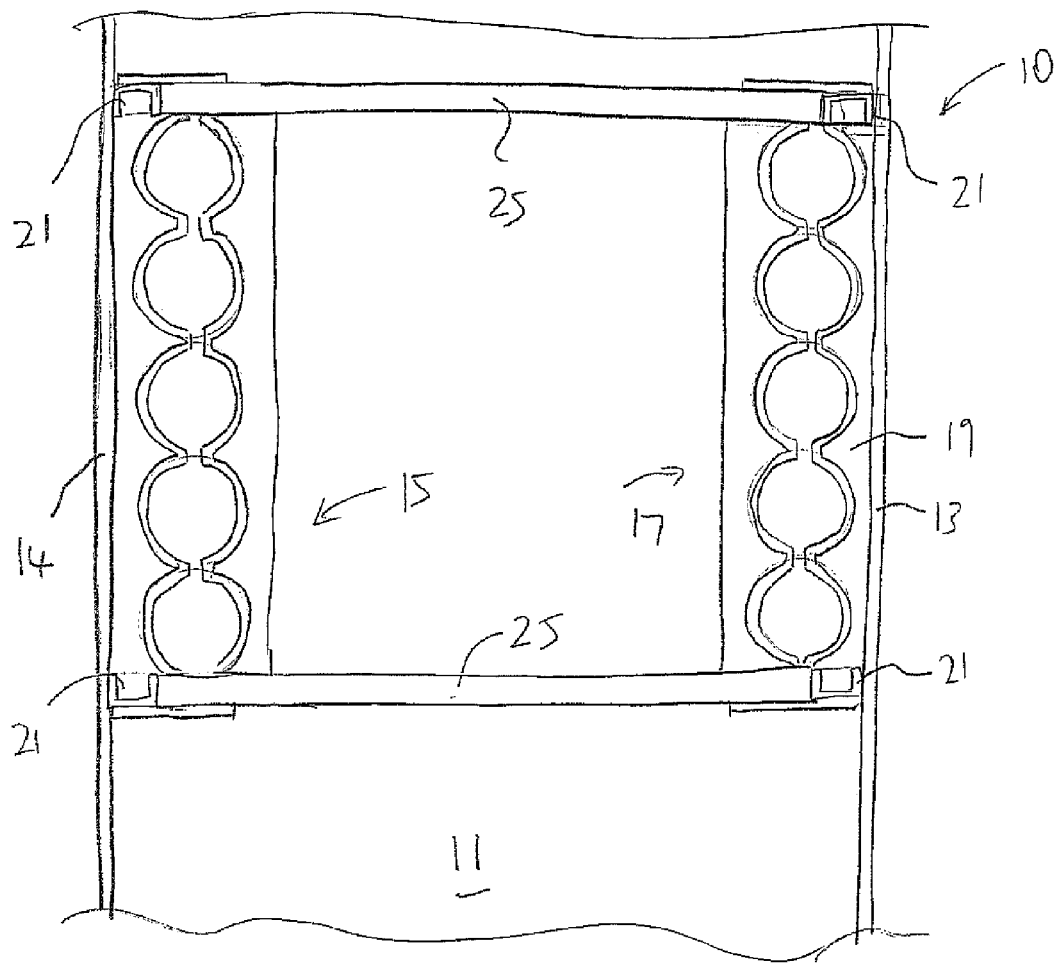
FIG. 5 is a top plan view of the rack in place in the vehicle of FIG. 1.

In FIG. 1 and also shown in FIG. 5 is shown a vehicle 10 which in most cases form a trailer for attachment to a towing vehicle but may be itself a self-propelled vehicle such as a truck. The vehicle includes a rear box having a floor 11, a roof 12 and side walls 13 and 14. The structure of these is shown only schematically since the structure of such vehicles can vary and is well known to a person skilled in the art. In most cases the vehicle will have posts and rails forming a structure for the walls and floor to provide some structural integrity and load bearing capability. However the present arrangement can be used with vehicles of different types having different arrangements for the structural integrity since the device is intended to provide its own structural strength.

The apparatus thus comprises a first rack member 15 containing a series of bottles 16 in a row along the side wall 14. The apparatus further comprises a second rack member 17 containing bottles 16 again arranged in a row along the side wall 13. The racks 15 and 17 are substantially identical but of course reversed so as to face inwardly. Each of the rack members comprises an upper bottle engaging member 19, a lower bottle engaging member 20 and frame members 21 thus providing an upstanding substantially rigid structure for standing along the respective side wall. In addition the rack member can include a rail 22 arranged to extend between the frame members 21 at a height approximately equal to or just above the top of the bottle with the frame member having a series of pins standing upwardly and located between each bottle and the next so that a chain 23 can be used as a temporary safety measure to hold the bottles upright when the bottle engaging members are released. The chain of course is not intended to act as a restraint except as a temporary safety measure. Thus the chain may be simply dropped over upstanding pins on the rail 22 to loop around the upper valve section of the bottle.

The frame members 21 comprise two or more upstanding posts. In the embodiment shown there are two such posts arranged at opposite ends of the rack member and standing upwardly along the side wall to an upper end 24 of the posts. At the upper end, each post is connected to a transverse rail 25 by an angle bracket 26 so that the transverse rail 25 extends across the roof 12 and connects between the posts of one rack member and the corresponding post of the opposite rack member. Thus there are an equal number of rails 25 to the number of posts 21 thus forming a rigid rectangular structure defined by the upstanding rack members and the transverse rails.

The bottom bottle engaging members are attached rigidly to the floor 11 by suitable bolts which extend through the floor and into a suitable structural member or through the floor as lag bolts. The posts may be connected to the wall for increased structural stability. However the transverse rails 25 provide a connection between the top of the rack members which can accommodate impact damage on the vehicle and even roll over of the vehicle since the rack members and the transverse rails form in effect a structural cage in the interior of the vehicle.

Figure 2:
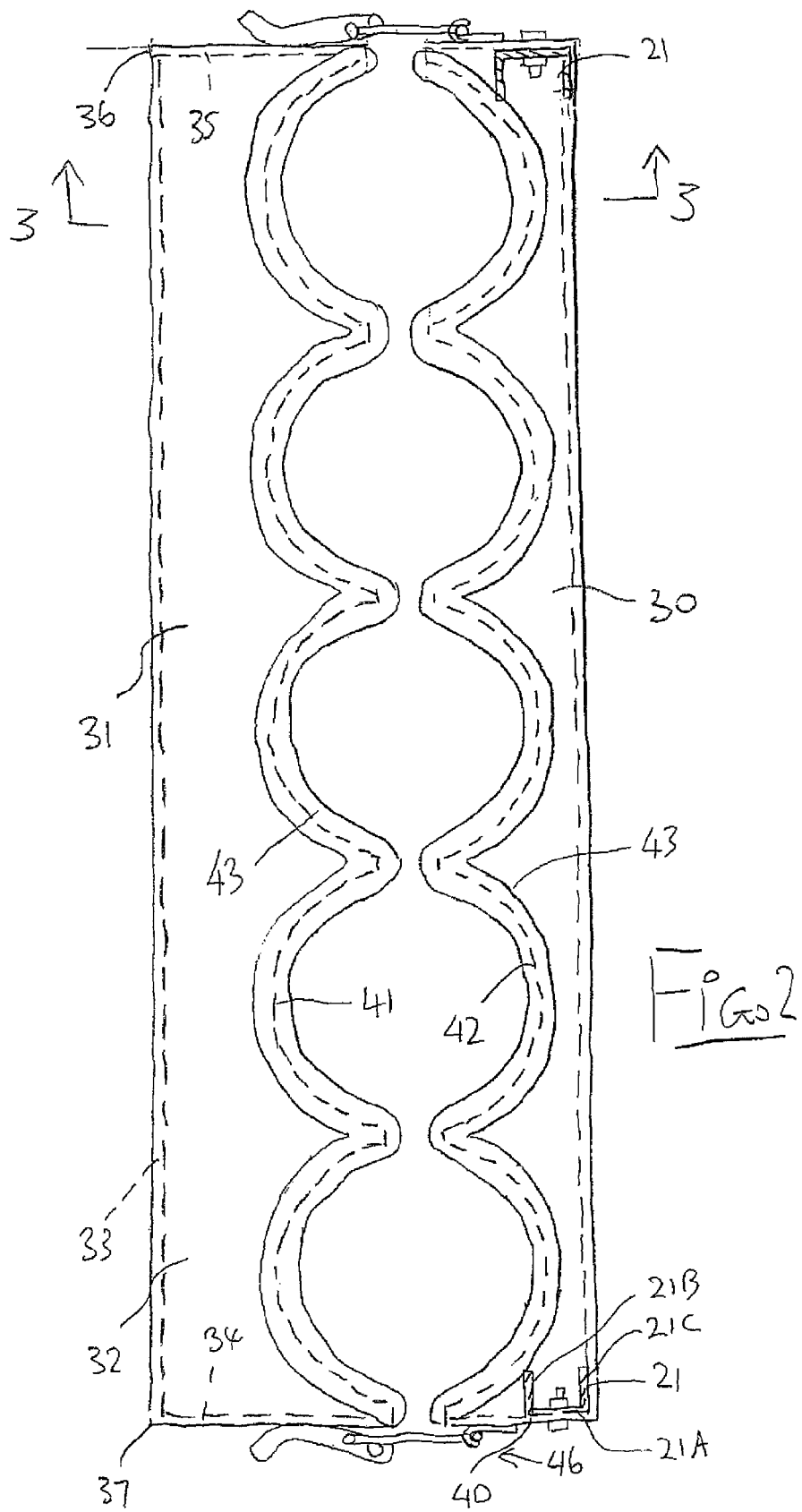
FIG. 2 is a view along the lines 2-2 of FIG. 1 showing the rack separated from the vehicle.
Figure 3:
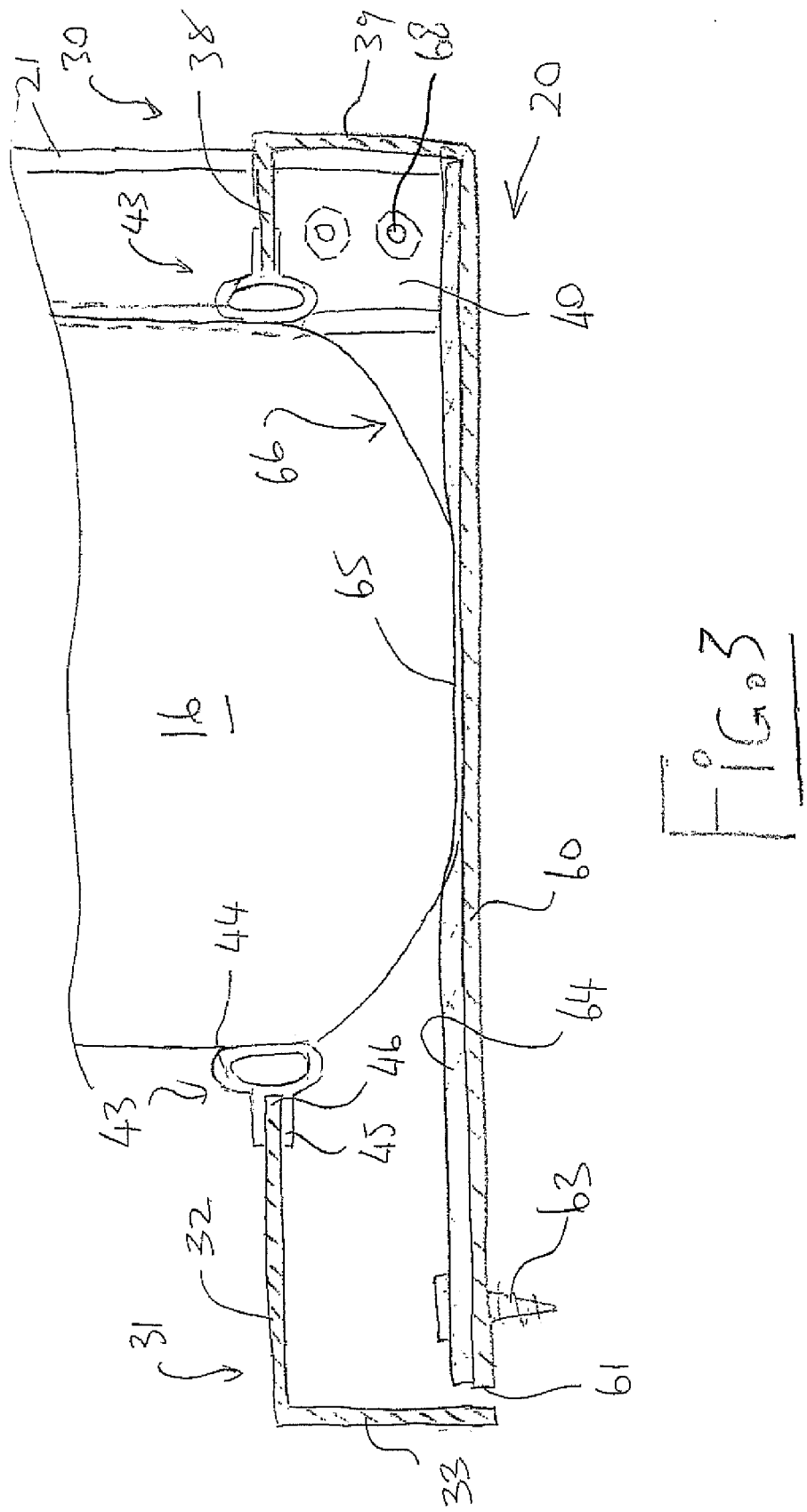
FIG. 3 is a cross sectional view along the lines 3-3 of FIG. 2 but showing the lower one of the two bottle engaging members.
Figure 4:
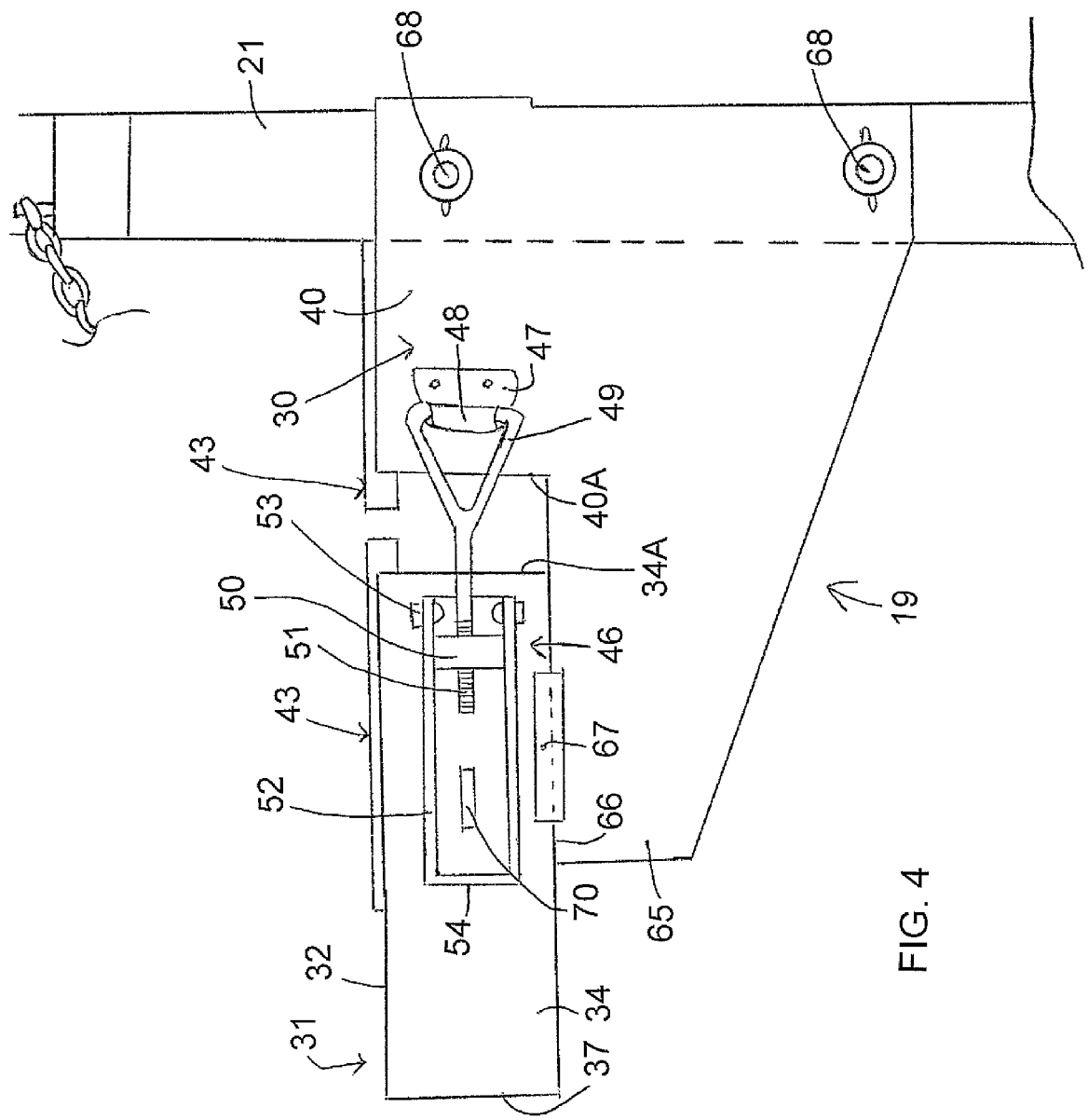
FIG. 4 is an end elevational view of the upper bottle engaging member of FIG. 2.

Turning now to FIGS. 2, 3 and 4, there is shown more detail of the structure of the rack members. Thus the rack member includes the upper and lower bottle engaging members 19 and 20 and these are basically of the same structure which is of the construction shown in FIGS. 2, 3 and 4. The differences between the two bottle engaging members will be described in more detail hereinafter. Thus each of the bottle engaging members comprises an outer clamping element 30 and an inner clamping element 31. Each of these is formed by sheet metal which is bent to form a top plate 32 and a depending side wall 33. Thus the inner clamping member 31 has the top wall 32 and the depending side wall 33 and also depending end walls 34 and 35. These are welded at the corners 36 and 37 to form in effect a box structure with an open bottom. The side walls provide increased structural strength for the top plate 32 to prevent bending of that top plate. Symmetrically the outer clamping element 30 includes a top wall or plate 38, a side wall 39 and end walls 40. Each of the top plates 32 and 38 is cut to form a series of part circular recesses 41 and 42 respectively. In the embodiment shown there are five such recesses for receiving five bottles. It will be appreciated that the number of bottles can be increased or decreased as required and typical examples of such racks may include only two bottles. In the event that more than five bottles along each side are intended to be stored, it is common that a second rack of the five bottle construction will be utilized rather than manufacture a rack of an increased dimension.

Along the recesses at the cut edge of the metal plate is provided a resilient strip 43 which is of a commercially available construction including a tubular bead 44 and a clamping slot 45 which engages onto the edge 46 of the metal plate. The clamping slot 45 clips onto the edge and is commonly retained by friction but the retaining forces may be increased by adhesive if required. The bead 44 is resilient and compressible so that the bead provides a clamping force onto the bottle but spreads that clamping force around the periphery of the bead to avoid metal to metal contact and to allow increased force to be applied without locating that force at specific points of contact.

The bead 43 extends along the full length of the cut edge of the clamping member from one end wall 34 to the other end wall 35. The end wall 34 of the outer clamping member has an end edge 34A which is spaced away from an end edge 40A of the end wall 40 of the inner clamping member. These end edges are pulled together in a clamping action by an over-center toggle latch generally indicated at 46. The toggle latch 46 includes a bracket 47 attached to the end wall 40 which has hook section 48 at the end adjacent the outer clamping member which engages with a loop 49 attached to the end wall 34 of the outer clamping member. This loop 49 is carried on a pin 50 and is adjustable relative thereto in a direction along the end wall 34 by a screw section 51. The pin 50 is carried on a lever 52 pivotally mounted on a bracket 53 so that a handle end 54 of the lever can be grasped and pivoted away from the end wall 34 on the vertical axis defined by the bracket 53 so as to move the pin 50 away from the end wall and toward the outer clamping member so as to release the loop 49 from the hook 48. Such over-center toggle latches are of course well known and commercially available but provide an effective way of tensioning the outer clamp member against the inner clamp member thus pulling the beads 43 against the peripheral wall of the bottle.

The bottom bottle engaging member 20 sits on the floor and is clamped to the floor. Thus the bottom bottle engaging member is shown in FIG. 3 and includes a base plate 60 which is attached to the side wall 39 and projects therefrom horizontally across the floor to an outer edge 61 beneath the underside of the inner clamping member 31. This base plate 60 can be fastened to the floor by suitable fasteners 63 which can be screws as shown or can be lag bolts or other elements connected to structural members of the floor as required and as suitable depending upon the structure of the vehicle. The base plate 60 carries a resilient layer of a fibrous material as indicated at 64 for engaging the apex 65 of the domed section 66 of the bottom of the bottle 16. The height of the walls 33 and 39 are arranged so that the bead 43 is located on the bottle at a position just beyond the end of the domed section 66 and into the cylindrical section of the bottle so as to clamp against that cylindrical section and to provide a grasping action on the cylindrical section. The height therefore can be of the order of three inches which is typical for bottles of this type.

The inner clamping element 31 of the bottom bottle engaging member 20 can sit on the floor when not in use so that its bottom edges of its side and end walls rest on the floor. They can then simply slide across the floor to the engagement position shown in FIG. 3.

The upper bottle engaging member which is shown in FIG. 4 and indicated at 19 is slightly modified in that there is no base plate 60 since the upper bottle engagement member engages the bottle at a position part way along its height. In addition it is necessary to support the inner clamping member 31 when it is released from clamping action and to locate it when it is required to slide into the clamping position. Thus the outer clamping member 30 includes a support rail 65 which projects beyond the end wall 40A there is a horizontal support surface 66 for engaging the bottom edge of the end walls 34 of the inner clamping member 31. A guide slot 67 can be provided mounted either on the bottom edge of the wall 34 or on the top edge of the rail 65 to hold the inner clamping member 31 in place when it is released from the latch 46.

The top wall of the outer clamping member 30 is cut to define openings for the posts 21. Each of the posts 21 is in the form of a channel with an outwardly facing base 21A and two inwardly extending legs 21B and 21C. The upper wall of the outer clamping member 30 is thus cut to form a slot to which the channel-shaped post 21 can be inserted. The post 21 is then bolted to the end wall 40 of the outer clamping member by bolts 68. In the upper member 19, these bolts 68 are spaced by the height of the outer clamping member 30 which includes the rail section 65. This provides additional structural strength. At the bottom as shown in FIG. 3, the bolts 68 are located within the three inch height of the outer clamping member on the end wall 40 thereof. As these bolts are hidden inside the frame structure of the rack member, this prevents a potential thief from accessing the bolts when the structure is in place and the bottles are loaded so that easy opening of the structure and release of the bottles is inhibited. For this purpose also the toggle latch includes a flange 70 which allows a lock to be inserted to hold the latch in the closed position. In this way security is increased and theft is inhibited.

And the fact that the rails pass through the structure of the outer clamping members increases structural strength and prevents the outer clamping members from being released from the posts in the event of significant impact which cause bending or distortion of the posts. However even in such a circumstance the outer clamping member remains attached onto the posts holding the bottles in place.

The horizontal rails 25 which connect the posts 21 are also formed as channel members providing significant structural strength. They can be formed as angles or tubes. The angle bracket 26 is in the form of a flat plate with two legs at right angles where each plate is bolted to the base of the channel of the post at one side and the rail at the other side. This again provides a structural connection between the rails and the posts which ensures that the structure remains integral even if distorted in an impact or roll over.

Thus the structure holds the bottles rigidly and permanently attached to the rack by the use of the inner and outer clamping members which are integrally formed by elements which surround all of the bottles of the row. Thus the outer clamping member engages one half of each of the bottles of the row and holds those bottles to the rails. The inner clamping member is clamped to the outer clamping member by the toggle latch and itself is an integral structure engaging each of the bottles thus holding the bottles side by side and ensuring that they are firmly held between the two clamping members. The bottles cannot lift as they are clamped vigorously by the clamping action of the beads. In this way the potential for release of hazardous materials for the escape of a potentially explosive bottle is significantly reduced.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A rack for transportation of pressurized gas bottles in a transportation vehicle comprising:
   a rack member for engaging and supporting a first plurality of the bottles in a row in upstanding orientation;
   the rack member having an upper bottle engagement member for rigidly engaging an upper part of each of the first plurality of bottles;
   the rack member having a lower bottle engagement member for rigidly engaging a lower part of each of the first plurality of bottles;
   the rack member having frame members interconnecting the upper and lower bottle engagement members such that the rack member forms a rigid structure for holding the bottles in rigid upright orientation;
   wherein each of the bottle engagement members forms a clamp for clamping around the plurality of bottles with the clamp having a first rigid member having a plurality of recesses each for partly surrounding a respective one of the bottles and a second rigid member having a plurality of recesses each for partly surrounding a respective one of the bottles facing the first rigid member, and a tensioning element for drawing the two rigid members together.

2. The rack according to claim 1 wherein the tensioning element is an over-center latch.

3. The rack according to claim 2 wherein the over-center latch is adjustable to adjust tension between the rigid members.

4. The rack according to claim 1 wherein each of the two rigid members of the clamp are cut from plate.

5. The rack according to claim 1 wherein each of the two rigid members of the clamp are formed by a top plate and turned down sides welded to form a box structure.

6. The rack according to claim 5 wherein each of the recesses is defined by an edge of a plate and has a resilient strip around the edge for resiliently engaging an outer surface of the respective bottle.

7. The rack according to claim 1 wherein the lower bottle engagement member has an outer rigid member fixed to the frame members and an inner rigid member movable relative to the frame members with the outer rigid member having a flat base for receiving a bottom apex of the bottles when engaged in the upper and lower bottle engagement members.

8. The rack according to claim 1 wherein the lower bottle engagement member has a flat base for receiving a bottom apex of the bottles when engaged in the upper and lower bottle engagement members and wherein the flat base is covered by a resilient material.

9. The rack according to claim 1 wherein the upper bottle engagement member has an outer rigid member fixed to the frame members and an inner rigid member movable relative to the frame members and wherein the outer rigid member has a support element thereon for engaging and supporting the inner rigid member as it moves in a sliding action relative to the frame members.

10. The rack according to claim 1 wherein the frame members comprise a row of at least two vertical posts at spaced positions along a side.

11. The rack according to claim 10 wherein the vertical posts pass through holes in the upper and lower engagement members.

12. The rack according to claim 1 further comprising:
   a second rack member for engaging and supporting a second plurality of the bottles in upstanding orientation;
   the second rack member having an upper bottle engagement member for rigidly engaging an upper part of each of the second plurality of bottles;
   the second rack member having a lower bottle engagement member for rigidly engaging a lower part of each of the second plurality of bottles;
   the second rack member having frame members interconnecting the second rack member upper and lower bottle engagement members such that the second rack member forms a rigid structure for upstanding along a first and second side of the transportation vehicle and for holding the bottles in rigid upright position along said second side;
   and a rigid transverse brace structure for connecting between an upper part of the first rack member and an upper part of the second rack member to hold the first and second rack members in fixed braced position at first and second sides.

13. The rack according to claim 12 wherein each of the first and second rack members is arranged to support the respective plurality of bottles in a single row.

14. The rack according to claim 12 wherein the frame members comprise a row of at least two vertical posts at spaced positions along a side and wherein the brace structure comprises a plurality of rails each extending across from one of the posts of the first rack member to a corresponding one of the post of the second rack member.

* * * * *